H. GINDELE.
FOCUSING HOOD.
APPLICATION FILED MAY 7, 1915.
1,261,919.
Patented Apr. 9, 1918.
2 SHEETS—SHEET 1.
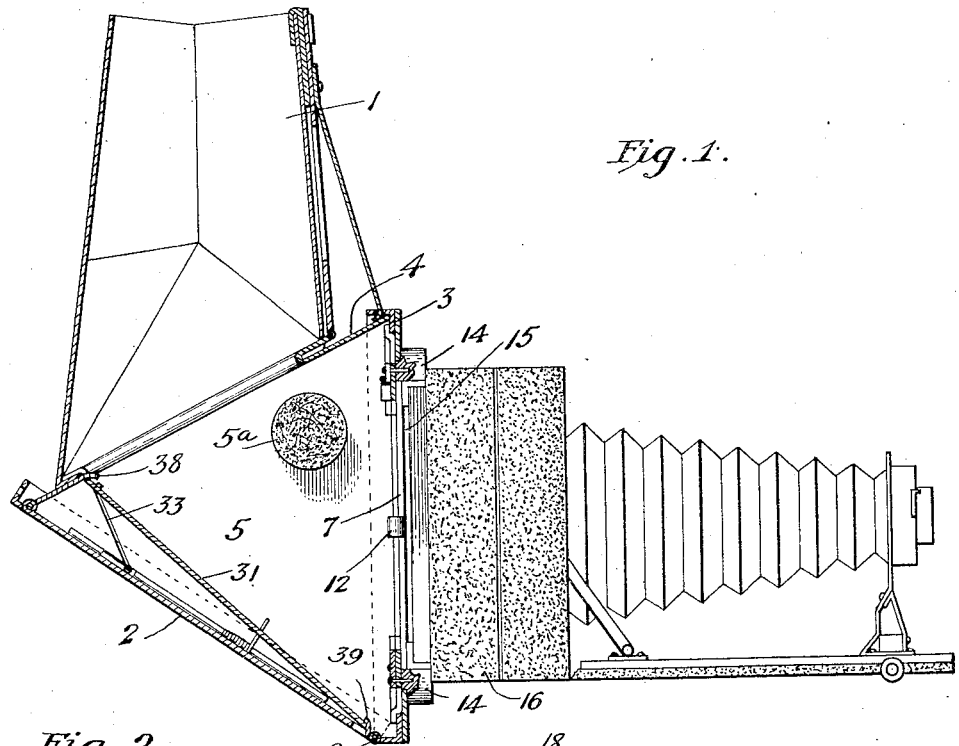
Fig. 1.
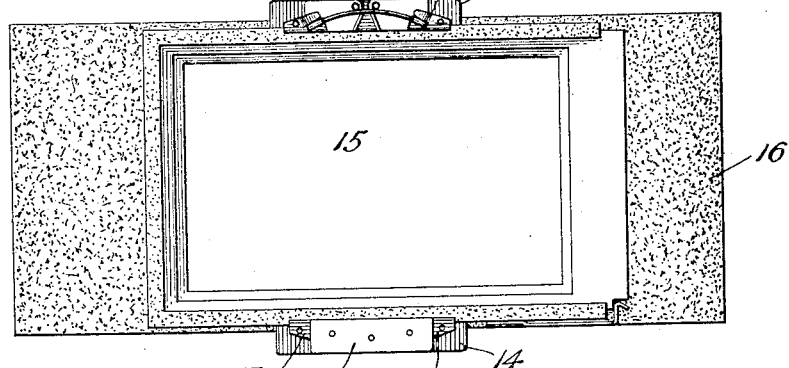
Fig. 2.
Fig. 6.
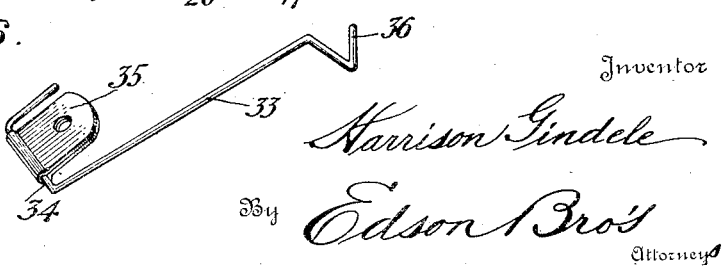
Witnesses
J. W. Michael Jr.
M. E. Clark
Inventor
Harrison Gindele
By Edson Bro's
Attorneys

H. GINDELE.
FOCUSING HOOD.
APPLICATION FILED MAY 7, 1915.

1,261,919.

Patented Apr. 9, 1918.
2 SHEETS—SHEET 2.

Witnesses:
J.W. Michael J.
M.E. Clark.

Inventor
Harrison Gindele

By Edson Bro's
Attorneys

UNITED STATES PATENT OFFICE.

HARRISON GINDELE, OF CINCINNATI, OHIO.

FOCUSING-HOOD.

1,261,919.　　　　Specification of Letters Patent.　　Patented Apr. 9, 1918.

Application filed May 7, 1915. Serial No. 26,616.

*To all whom it may concern:*

Be it known that I, HARRISON GINDELE, a citizen of the United States, residing at Cincinnati, in the county of Hamilton and State of Ohio, have invented certain new and useful Improvements in Focusing-Hoods; and I do hereby declare the following to be a full, clear, and exact description of the invention, such as will enable others skilled in the art to which it appertains to make and use the same.

This invention is a focusing hood for cameras of the type illustrated in my Patent No. 1,115,423 granted on Oct. 27, 1914.

The purpose of this invention is to provide a collapsible focusing hood which may be readily applied and removed from hand cameras of the view type or the collapsible folding type, wherein the focusing field is of greater length than its width, whereby the hood may revolve to various focusing positions on the camera. The arrangement is such that the parts may be quickly and easily distended for focusing purposes, the elements thereof being actuated by resilient means. On the other hand, the elements of the attachment may be compactly folded into a small space and the whole device bodily removed from a camera by the manipulation of a single locking clip of novel design.

While a preferred embodiment of the invention is illustrated in the accompanying drawings, it is to be understood that the disclosure therein made is for the purposes of illustration only, and not as defining the limits of the invention.

Figure 1 is a side elevation of the attachment applied to a hand camera with the elements of the focusing hood in their distended position.

Fig. 2 is a rear elevation of a camera with the focusing clip applied thereto ready to receive the attachment.

Fig. 6 is a detail view of the resilient element which is adapted to be interposed between the base plate and reflector plate.

Figure 3:
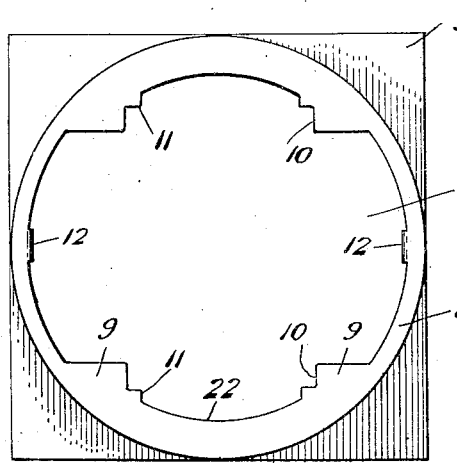
Fig. 3 is a top plan view of the view plate and attaching plate.
Figure 4:
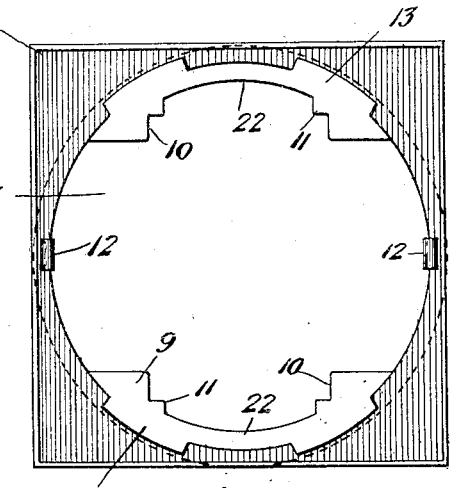
Fig. 4 is a bottom plan view of the view plate and attaching plate.
Figure 5:
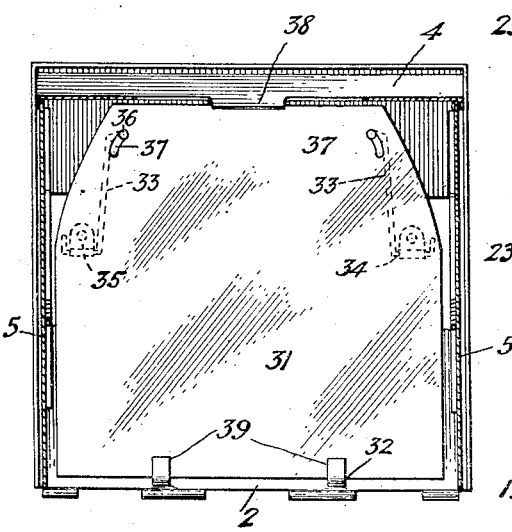
Fig. 5 is a detail view of the reflector plate applied to the base plate.

The attachment comprises a plurality of pivoted plates mounted upon a base plate, one of the pivoted plates having means revolubly mounted thereon to engage clips secured to a camera body and thereby permit the hood attachment to be moved to various positions on the camera with relation to the appearance of the subject upon the focusing glass. One of the clips is provided with locking means whereby the attachment may be quickly applied or detached from the camera body.

Referring more particularly to the construction illustrated in the drawings, the attachment comprises a collapsible hood indicated at 1 which may be of any preferred form and construction, such for example as that disclosed in my Patent No. 1,115,423, previously referred to. The device is shown provided with a base plate 2, a view plate 3, a hood mounting plate 4, and side plates 5 having a cushion element 5ª adapted to engage a reflector. These plates may be of any preferred construction and material, and are so arranged that plates 3, 4 and 5 are pivotally mounted upon the base plate 2 so that they may be folded compactly against said base plate. The base plate is pivoted at one end thereof to the view plate 3, as indicated at 6, which obviates the necessity of employing hinges intermediate the base plate.

The view plate 3 is provided with a large circular aperture 7 which is preferably of such diameter as to include the field of the ground glass of the camera. Associated with the view plate 3 is an attaching plate 8, which is shown provided with widened portions 9 positioned opposite to each other, each of said widened portions being provided with notches as at 10, and a spur 11. This plate 8 is also provided with ears 12 which are adapted to be bent over and into engagement with the opposite face of plate 3, and if desired, the widened portions 9 may be provided also with ears 13 to engage the opposite face of the plate 3, whereby the attaching plate 8 is secured to the view plate 3. By mounting the attaching plate to the circular opening 7, the attaching plate is rotatably mounted on the view plate, or vice versa, the circular edge of the opening serving as a track upon which the plates may have rotative movement with relation to each other.

Figure 7:
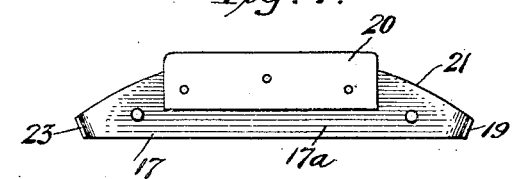
Fig. 7 is a front elevation of a fixed retaining clip.
Figure 8:
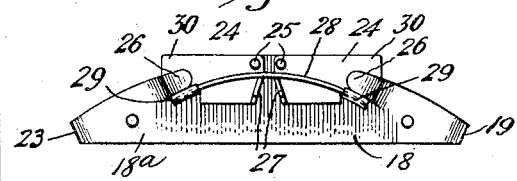
Fig. 8 is a front elevation of the retaining clip having resilient locking means.
Figure 9:
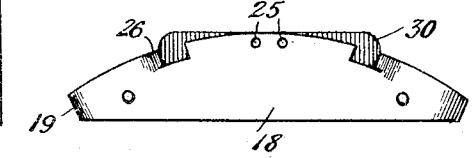
Fig. 9 is a rear elevation of the retaining clip having resilient locking means.

The device is adaptable for use in connection with either view cameras or hand cameras of the collapsible type, but in the drawings it is shown applied to the small foldable camera. In Fig. 2 the retaining clips are shown applied to a plate adapter for a film camera and are mounted upon blocks 14 positioned adjacent the focusing glass 15 of the back 16. Upon the blocks 14 may be mounted the retaining clips 17 and 18. The clip 17 is illustrated more clearly in Fig. 7 as provided with a base member 17ª and may be also provided with inturned ears 19, for some types of cameras. The base plate is shown provided also with a protruding element 20 which may extend beyond the curved edge 21 of the base 1. This curved edge is designed to engage the curved edge 22 of the attaching plate, in one form of the device, and may be positioned in contact with the curved edge 7 of the view plate 3 when the clip is used for another form of the device wherein the portion 22 of the view plate may be omitted. The clips 17 and 18 are designed to be positioned with relation to the widened portion of the attaching plate 8, and to be interposed between the notches 10 and to have the flattened ends 23 thereof engage the spurs 11 of the attaching plate.

The clip 18 is provided with a plurality of pivoted elements 24 which are adapted to protrude beyond the curved edge 21 of the clip. These elements may be pivoted as at 25 near a central portion of the clip, and the base member 18ª may be provided with upstanding guiding means 26 stamped up from the base member 18ª. Each of the pivoted elements may be provided with an actuating flange 27. Associated with the pivoted elements is a resilient element 28 in the form of a single pliable rod, the ends of which are loosely mounted at 29 on the base member 18ª, while the central portion thereof is adapted to contact with an end of each of the actuating flanges 27. The positioning of the resilient element 28 to engage the flanges 27, will serve to deflect the ends 30 of the pivoted elements outwardly beyond the curved edge 21 of the member 18ª, which ends 30 serve to engage the attaching plate 8 to lock the hood to a camera.

The base plate 2 is provided with a reflector indicated at 31, which is preferably pivoted at 32 to the base plate 2. Interposed between the base plate 2 and reflector plate 31, is shown a plurality of resilient elements in the form of an arcuate leaf spring 33, having an angular portion 34 secured by a clip 35 to the base plate. The free end of the leaf spring 33 is preferably bent at an angle to the body thereof terminating in an upstanding spur 36 which is adapted to extend through an arcuate slot 37 in the reflector plate. These leaf springs 33 serve to elevate the reflector plate when the attachment is moved to its distended position, and the elevation of the reflector plate 31 may be limited by suitable stop devices such as the flanges 38 and the nibs 39, whereby the plate may be positioned at the proper angle with relation to the base plate and the view plate, for the operator to view the image in correct alinement with the view opening of the focusing hood.

The hood may be collapsed and folded into a very small space and entirely removed from the camera by means of the locking clip 18. When it is desired to apply the attachment to a camera, the clip 17 is brought into engagement with one of the widened portions of the attaching plate, until the protruding edge 20 thereof overlaps the part at 22 of the attachment, whereupon the pivoted elements 24 may be retracted by means of the flanges 27 against the action of the spring 28 until they pass beyond the part 22 of the upper widened portion, whereupon the pivoted elements may be released to engage the inner face of the attaching plate. Thereafter, the plates 3, 4 and 5 may be moved to their extended positions and the operation of the focusing and exposing of the camera, be carried on as usual.

The cut-out portion of the widened part of the attaching plate is designed to receive between the members, the hinge of the hood plate, the attaching plate serving to prevent the rotation of the device when the frame is collapsed on the back of the camera.

It is obvious that various changes may be made in the details of construction herein presented, and the right is reserved to make such changes and alterations as fairly fall within the scope of the appended claims.

Having thus described my invention, what I claim as new and desire to secure by Letters Patent is:

1. A foldable focusing attachment for cameras comprising a base plate having a reflector mounted thereon, and means to elevate the reflector when the attachment is in its distended position.

2. A focusing attachment for cameras comprising a base plate, a reflector pivotally mounted thereto, and resilient means to engage the reflector.

3. A focusing attachment for cameras comprising a base plate, a reflector pivotally mounted thereto, and resilient means positioned between the reflector and the base plate.

4. A focusing attachment for cameras comprising a base plate, a reflector pivotally mounted thereon and provided with an arcuate slot, and a resilient element adapted to be interposed between the base plate and reflector and to have an arm thereof ride in said arcuate slot.

5. A collapsible frame forming a focusing attachment for cameras including a view plate having an aperture, and an attaching plate mounted for revoluble movement on the view plate, and means to detachably mount the attaching plate to a camera, whereby the focusing attachment may be rotated bodily with relation to the camera.

6. A focusing attachment for cameras including a view plate adapted to be secured directly to the back of a camera and provided with a circular aperture, an attaching plate interposed between the view plate and the camera, said attaching plate having means to engage the view plate whereby the periphery of the aperture may serve as a track for the attaching plate, and means on the camera to engage said attaching plate to permit the focusing attachment and its view plate to be rotatably moved to various positions on the camera.

7. A focusing attachment for cameras including a view plate, an attaching plate to connect the view plate with the camera, said attaching plate having guides to engage the view plate to secure the attaching plate in rotatable relation thereto, and means carried by the camera to engage the attaching plate and secure said view plate on the camera.

8. In a focusing attachment for cameras, a view plate, a substantially circular attaching plate to connect the view plate with the camera, said attaching plate adapted to be positoned against one face of the view plate and provided with means to engage the other face of said view plate, said attaching plate being of greater width at one portion thereof, and means to engage a wider portion of said attaching plate to secure the attachment to a camera and permit of rotative movement between the view plate and the attaching plate for the purpose of rotating the attachment on the camera.

9. In a focusing attachment for cameras, a view plate, a substantially circular attaching plate rotatably mounted on the view plate to connect a view plate with the camera, a portion of the attaching plate being of greater width than the remaining portion, said plate being provided with notches formed in said wider portions, and means on the camera to engage the wider portions of the attaching plate and to be positioned between the notches thereof.

10. In a focusing attachment for cameras, a substantially circular attaching plate having a central opening, a view plate having a substantially central aperture of substantially the same diameter as the opening in the attaching plate, means on the attaching plate adapted to extend through the aperture of the view plate to secure the attaching plate thereto for rotatable movement, and means to engage the attaching plate to secure the plate to the camera.

11. In a focusing attachment for cameras, a view plate, an attaching plate removably mounted thereon, and a plurality of retaining clips adapted to be secured to a camera to secure the attaching plate and permit of rotative movement between the attaching plate and the view plate, one of said clips having resilient locking means whereby the attachment may be quickly applied to and removed from the camera.

12. In a focusing attachment for cameras, a plurality of oppositely positioned retaining clips adapted to be secured to the camera near the view opening thereof, said clips having protruding members, and a collapsible frame adapted to be engaged by the protruding members to retain the frame on the camera.

13. In a focusing attachment for cameras, a collapsible frame, an attaching plate to revolubly mount the frame on the camera, said plate having means to be engaged by clips secured to the camera, one of said clips embodying a base member having an arcuate edge, a pivoted element adapted to protrude beyond said edge, and resilient means to engage said pivoted member.

14. In a focusing attachment for cameras, a collapsible frame, an attaching plate to revolubly mount the frame on the camera, said plate having means to be engaged by clips secured to the camera, one of said clips embodying a base member having an edge adapted to engage the attaching plate, an element pivoted to said base member and adapted to protrude beyond the engaged edge thereof, guiding means on the base member for the pivoted element, and resilient means to engage said pivoted element.

15. In a focusing attachment for cameras, a collapsible frame, an attaching plate to revolubly mount the frame on the camera, said plate having means to be engaged by clips to secure the same to a camera, one of said clips embodying a base member, a plurality of elements pivoted thereto and adapted to extend beyond an edge thereof, and a single resilient element to engage said pivoted elements.

16. In a focusing attachment for cameras, a collapsible frame, an attaching plate adapted to be engaged by clips secured to the camera to maintain the frame on the camera, one of said clips having a base member and a plurality of pivoted elements mounted thereon, each of said pivoted elements having an actuating flange, and a resilient element adapted to engage said actuating flanges to maintain the pivotal elements in a predetermined position.

17. In a focusing attachment for cameras, a collapsible frame, an attaching plate adapted to be engaged by clips to secure the same to a camera to maintain the frame on the camera, one of said clips having a base member and a plurality of pivoted elements mounted thereon, each of said pivoted elements having an actuating flange and a single resilient element having each end thereof loosely mounted on the base member and adapted to engage said actuating flanges to maintain the pivoted element in a predetermined position.

In testimony whereof, I affix my signature, in presence of two witnesses.

HARRISON GINDELE.

Witnesses:
MAX GINDELE,
JOHN BUEHLER.

Copies of this patent may be obtained for five cents each, by addressing the "Commissioner of Patents Washington, D. C."